2 Sheets, Sheet 1.
N. Meyer,
Sewing Machine.
No. 3994. Reissued, May 24, 1870
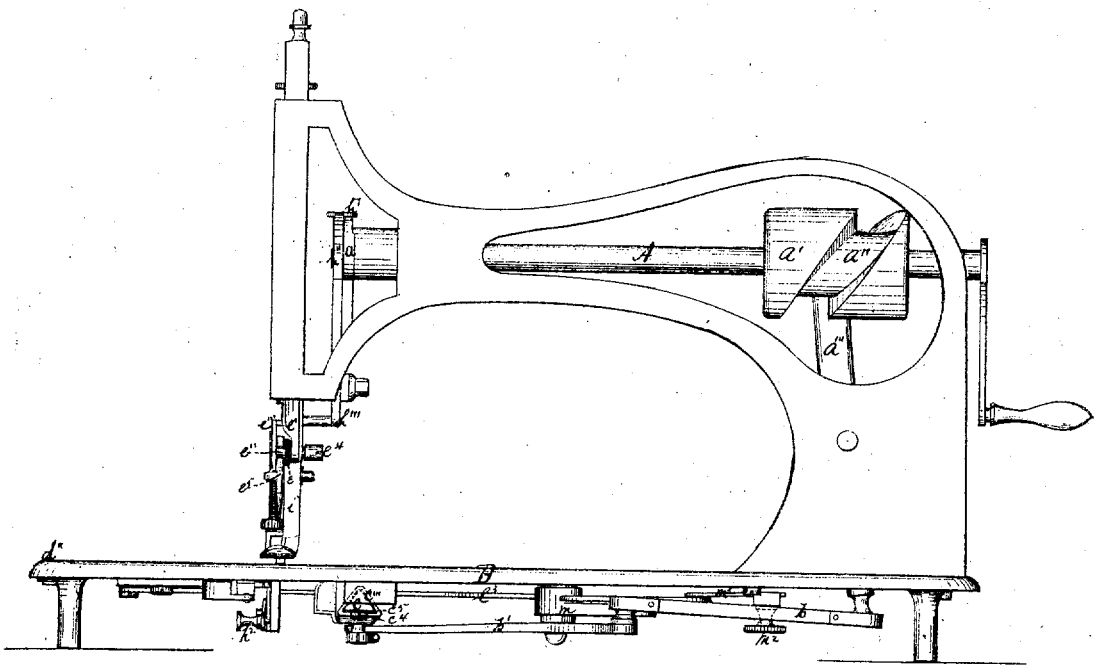
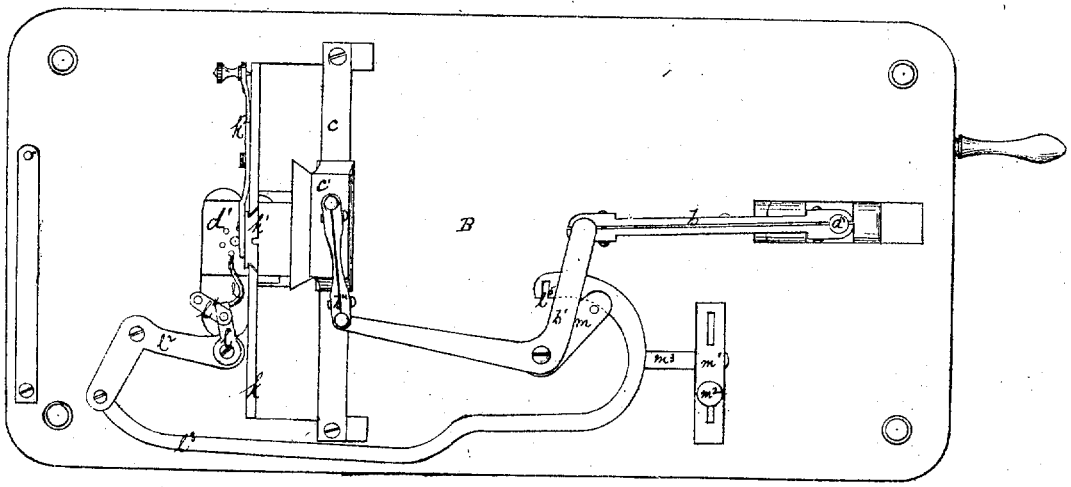
Witnesses
E. G. Brown
E. Julius.
Inventor, Nicholas Meyer by
Geo. E. Brown, Atty.

2 Sheets, Sheet 2.

N. Meyer,
Sewing Machine.

No 3994. Reissued. May 24. 1870.

Witnesses
C. O. Brown
E. Julius.

Nicholas Meyer, Inventor
by Geo. E. Brown Atty.

United States Patent Office.

THE GLOBE SEWING-MACHINE COMPANY, OF BUFFALO, NEW YORK, ASSIGNEES OF NICHOLAS MEYERS.

*Letters Patent No.* 99,783, *dated February* 15, 1870; *reissue No.* 3,994, *dated May* 24, 1870.

IMPROVEMENT IN SEWING-MACHINE.

The Schedule referred to in these Letters Patent and making part of the same.

Be it known that NICHOLAS MEYERS, of Buffalo, in the county of Erie and State of New York, did invent certain new and useful Improvements in Sewing-Machines, of which the following is a specification.

*Nature and Objects of the Invention.*

The invention consists in certain novel combinations and arrangements of parts, having for their object, a sewing-machine capable of making different varieties of stitches, as will be fully set forth hereinafter.

*Description of the Drawings.*

Figure 1 is a side elevation of the mechanism, above and below the supporting-table.

Figure 2 is a plan view of the mechanism beneath the table.

*General Description.*

Figure 3:
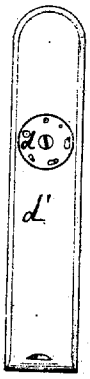
Figure 3 is a detached view of the slide and adjustable cloth-plate.
Figure 4:
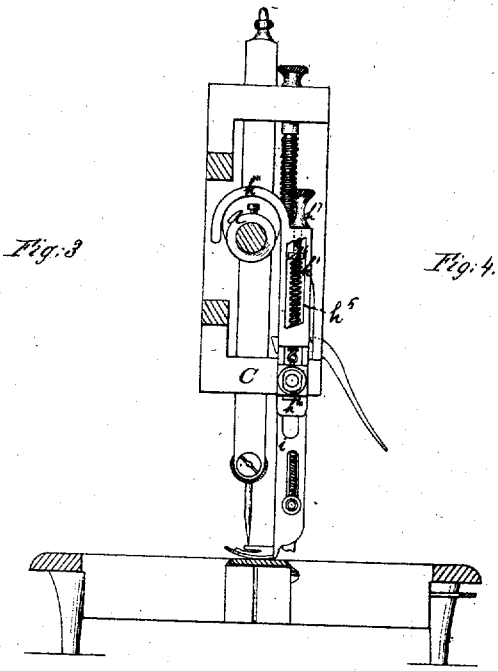
Figure 4 is a vertical sectional view, showing the eccentric disk, with its rider, and the tube, with its pressure spring.
Figure 6:
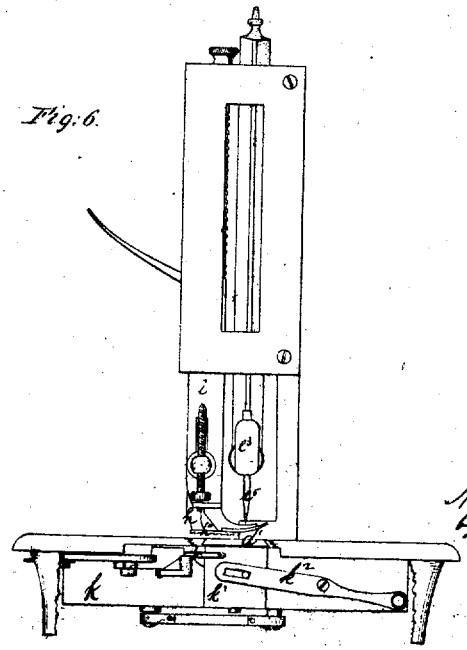
Figure 6 is a side elevation, showing the flange beneath the table, the sliding needle-chamber block, and its operating lever.
Figure 5:
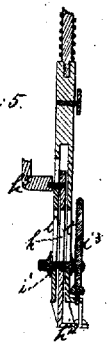
Figure 5 is a detached vertical section, showing the recessed presser-bar, inclosed feed-lever and stitch-regulating mechanism.

A is the motor-shaft, bearing at one end the eccentric disk $a$, and at the other end the cam $a'$.

The cam-groove $a''$ operates the vibrating lever $a'''$, which imparts the required reciprocating motion to the shuttle-carriers $c'$, through the medium of the connecting-rods $b$ $b''$ and the elbow-lever $b'$.

The eccentric disk $a$ operates the feeding-mechanism. It is embraced by a curved rider, $h''$, so shaped as to receive motion in three directions, one upward, and two lateral.

The curved rider projects from the upper end of a tube, $h'$ from the lower end of which projects a plate, $h^3$, slotted to receive a pivot, passing into the frame C.

A pin, extending from the lower end of the slotted plate $h'''$ through an orifice in the side of the presser-bar $i'$, and passing into the upper end of the feed-lever $h$, makes a joint with the feed-lever, which bears the toothed feed-plate $h^4$ on its lower end, and is itself pivoted in the presser-bar.

Thus, the three motions of the curved rider $h''$ are communicated to the feed-plate through the compound lever $h$ $h'$; but as the weight of the connecting system of levers is insufficient to insure the taking hold of the cloth by the toothed feed-plate, the tube $h'$ is provided with an inner spiral spring, $h^5$, connected at one end to the pivot of the slotted plate $h^3$, and at the other end to the sliding head $h^6$, which is controlled by the regulating-screw $h^7$. As the sliding head is raised or lowered by the screw, the pressure of the feed-plate upon the cloth is increased or diminished.

The needle-carrier is formed of a bar, triangular in its cross-section, and held in bearings in the face-plate, which supports the presser-foot. It is provided at its lower end with mechanism for holding and adjusting the needle laterally with respect to the shuttle, consisting of a tube, $e$, having a milled exterior flange at one end, and threaded on its outer surface, so that it may be screwed into a horizontal orifice made crosswise of the needle-bar $e'$, and near its lower extremity.

In the tube $e$ is placed a pin, $e''$, bearing at one end a vertical plate, $e'''$, and threaded exteriorly, so as to receive a nut, $e^4$, upon its outer end, at the opposite side of the needle-bar.

The pin $e''$ has an orifice made through it vertically, in which the needle $e^5$ is placed, which is clamped between the plate $e^3$ and the flange of the tube $e$.

Upon loosening the nut $e^4$ the tube $e$ may be screwed out of the needle-bar or carrier, and the needle, between the pin $e''$ and vertical plate $e^3$, will be moved in a horizontal direction until the nut $e^4$ strikes against the needle-bar. If the adjustment is not then completed, the nut may be again loosened. Upon screwing the tube $e$ back through the needle-bar, the pin $e''$ becomes slackened, and should be made to follow the tube by pressure. The slack is to be taken up by the nut $e^4$.

A vertical flange, $k$, runs transversely beneath the table, and forms a face for the shuttle to run against. The middle portion, $k'$ of the flange, is separate from the rest, and forms a sliding block, so arranged as to be withdrawn from place by the operation of a lever, $k''$, jointed to it and pivoted upon the flange.

The block $k'$ contains a vertical recess, $k^2$, which forms a needle-groove which the upper needle enters at each descent.

The curved looper $l$, projecting from one end of the block $l^1$, receives a vibrating motion from the elbow-lever $b'$ through the medium of the bars $l^2$ $l^3$, and it is caused to traverse the proper curve by means of a controller-bar $l^4$, pivoted at one end to the table, and at the other to the block $l^1$.

When the shuttle is in use to form the lock-stitch, and the looper out of gear, the block $k^1$ is brought up close against the under side of the slide $d'$, to form a continuous face for the shuttle to work against; but when the looper is to be brought into play to form the loop-stitch, the location of this block would prevent the looper from crossing the path of the needle to seize the loops of needle-thread. The block $k^1$ is, therefore, lowered far enough to permit the looper to have free play in the space above it, and to operate in connection with the needle, to form the loop-stitch, when the shuttle is removed.

The connecting-bar $l^3$, which is pivoted to the elbow-lever $l^2$, and communicates motion to it from the lever $b'$, is bent at one end into a curved form, as shown in fig. 2, and provided with a notch, $l^5$.

An arm, $m$, is secured upon the pivot of the elbow-lever $b'$, so as to turn generally with it, but occasionally upon it, and has a pin projecting upward from its free end.

The curved part of the connecting-bar $l^3$ has a sliding motion upon the pivot at its opposite end, and its notch, $l^5$, may consequently be moved upon or away from the pin of the arm $m$, and locked by the slide $m'$ and set-screw $m''$, operating upon the arm $m^3$, secured to the curved part of the bar, so as to be incapable of further lateral motion, but capable of being moved longitudinally.

When the connecting-rod $l^3$ is thus locked upon the arm $m$, the vibration received by the latter from the elbow-lever $b'$, is communicated to the former, and through it indirectly to the curved looper, which is thus operated by direct connection with the shuttle-driving apparatus.

If the slide $m'$ is unloosed, the curved part of the connecting-rod $l^3$ may be moved away from the pin on the arm $m$, so that when the connecting-rod is shoved endwise toward the curved looper, the looper-block, by the movement, will be folded partially upon its elbow-lever, and the looper withdrawn from the space above the block $k'$.

The block and shuttle may then be replaced, and the machine adjusted to make the lock-stitch.

The shuttle-carrier $c'$ is arranged to compensate for any wear of the parts by means of the triangular bar $c$, the carrier being arranged to slide upon the bar as it is reciprocated by the elbow-lever $b'$, so that, as the carrier is adjusted by the screws which work through the bottom of the carrier and against a shoe bearing upon the under side of the bar, it will be drawn down upon the angular edge of the bar, and the surfaces which work upon each other will be drawn in closer contact.

The slide $d'$ is provided with a circular plate, $d$, having a series of needle-holes, of graduated sizes, arranged around its edge, and capable of being turned at pleasure upon the screw which secures it to the slide $d'$, so that the needle-hole may be adjusted to the size of the needle in the machine. The plate is so adjusted with reference to the block $k^1$, that the needle-hole in use will be in line with the groove in the block entered by the needle.

*Claims.*

1. The driving-shaft A, cam $a'$, vibrating lever $a'''$, connecting-rods $b$ $b''$, elbow-lever $b'$, and shuttle-carrier, combined, arranged, and operating substantially as and for the purposes described and specified.

2. The combination with the needle-carrier, of the needle-holding and adjusting devices, constructed, arranged, and operating substantially as and for the purposes set forth and specified.

3. The arrangement and combination of the bar $l^4$, vibrating looper-block $l^1$, and levers $l^2$ $l^3$, for guiding the curved looper, substantially as and for the purposes described and specified.

4. The mechanism for connecting and disconnecting the under needle or looper for making the double-loop stitch, consisting of the bar $l^3$, provided with slot $l^5$ and arm $m^3$, and the clamping-plate $m^1$, and screw $m^2$, and the shuttle-lever $l^1$, substantially as described and specified.

5. The arrangement and combination of the sliding lever $h'$, rider $h''$, feed-lever $h$, adjustable fulcrum $i'$, eccentric $o$, and driving-shaft, substantially as described and specified.

6. The arrangement of a shuttle-race face-plate, provided with a vertically-adjustable needle-guiding block, between a shuttle-carrier and a thread-carrying looper, so that the race-face can be kept whole or continuous, to allow the shuttle to operate against it, or have an opening through it between the top of such block and the needle-hole plate, for the passage of the looper, substantially as set forth and specified.

7. The plate $d$, with the holes for the needle, the face of the shuttle-race, and the block $k^1$, provided with a groove for the needle, so combined and arranged that the groove in the block coincides with the hole in the plate, and, that the block may be moved away from the plate to form a space for the looper to vibrate in when the shuttle is removed, or kept in position to make the face continuous for the travel of the shuttle, substantially as described and specified.

THE GLOBE SEWING-MACHINE CO.
By ELWOOD S. CORSER, *President.*

Witnesses:
E. L. CHAMBERLAYNE,
C. W. PRATT.